(12) United States Patent
Shoffner

(10) Patent No.: US 10,343,228 B2
(45) Date of Patent: Jul. 9, 2019

(54) CONVEX CURVE CUTTER

(71) Applicant: Martin L. Shoffner, Knoxville, TN (US)

(72) Inventor: Martin L. Shoffner, Knoxville, TN (US)

(*) Notice: Subject to any disclaimer, the term of this patent is extended or adjusted under 35 U.S.C. 154(b) by 0 days.

(21) Appl. No.: 15/634,641

(22) Filed: Jun. 27, 2017

(65) Prior Publication Data
US 2018/0009048 A1    Jan. 11, 2018

Related U.S. Application Data

(60) Provisional application No. 62/493,525, filed on Jul. 8, 2016.

(51) Int. Cl.
*B23D 53/06* (2006.01)
*B23D 55/04* (2006.01)
*B23D 55/02* (2006.01)

(52) U.S. Cl.
CPC .......... *B23D 53/06* (2013.01); *B23D 55/023* (2013.01); *B23D 55/04* (2013.01)

(58) Field of Classification Search
CPC ....... B23D 53/06; B23D 55/023; B23D 55/04
See application file for complete search history.

(56) References Cited

U.S. PATENT DOCUMENTS

| | | | | |
|---|---|---|---|---|
| 2,535,673 A * | 12/1950 | Forbes | ............. | B23D 59/00 83/410.9 |
| 4,986,152 A * | 1/1991 | Sammons | ............. | B23D 55/046 144/134.1 |
| 5,121,554 A * | 6/1992 | Havins | ............. | B23D 47/025 30/376 |
| 5,261,304 A * | 11/1993 | Stollenwerk | ............. | B23D 55/023 144/287 |
| 6,220,132 B1 * | 4/2001 | Faircloth | ............. | B23D 53/06 83/13 |
| 6,651,541 B2 | 11/2003 | Faircloth | | |
| 7,661,346 B1 * | 2/2010 | Rekhels | ............. | B23Q 9/00 83/574 |
| 2007/0006706 A1 * | 1/2007 | Watanabe | ............. | B23D 53/06 83/788 |
| 2011/0209592 A1 * | 9/2011 | Chung | ............. | B23D 45/061 83/446 |

* cited by examiner

*Primary Examiner* — Andrea L Wellington
*Assistant Examiner* — Fernando A Ayala
(74) *Attorney, Agent, or Firm* — Pitts & Lake, P.C.

(57) ABSTRACT

A portable bandsaw attachment for cutting symmetrical or asymmetrical convex curved sides into a multisided three dimensional workpiece comprising a rotating table that supports the workpiece, a stationary base that supports the rotating table and provides an attachment point for the rotating table, laterally movable guides and backstop arrangement attached to the rotating table for locating and securing the workpiece relative to the bandsaw blade. The attachment can include handles to grip and turn the rotating table, an opening in the stationary base to provide clearance for the bandsaw blade, and means for securely mounting the stationary base to the bandsaw table.

12 Claims, 7 Drawing Sheets

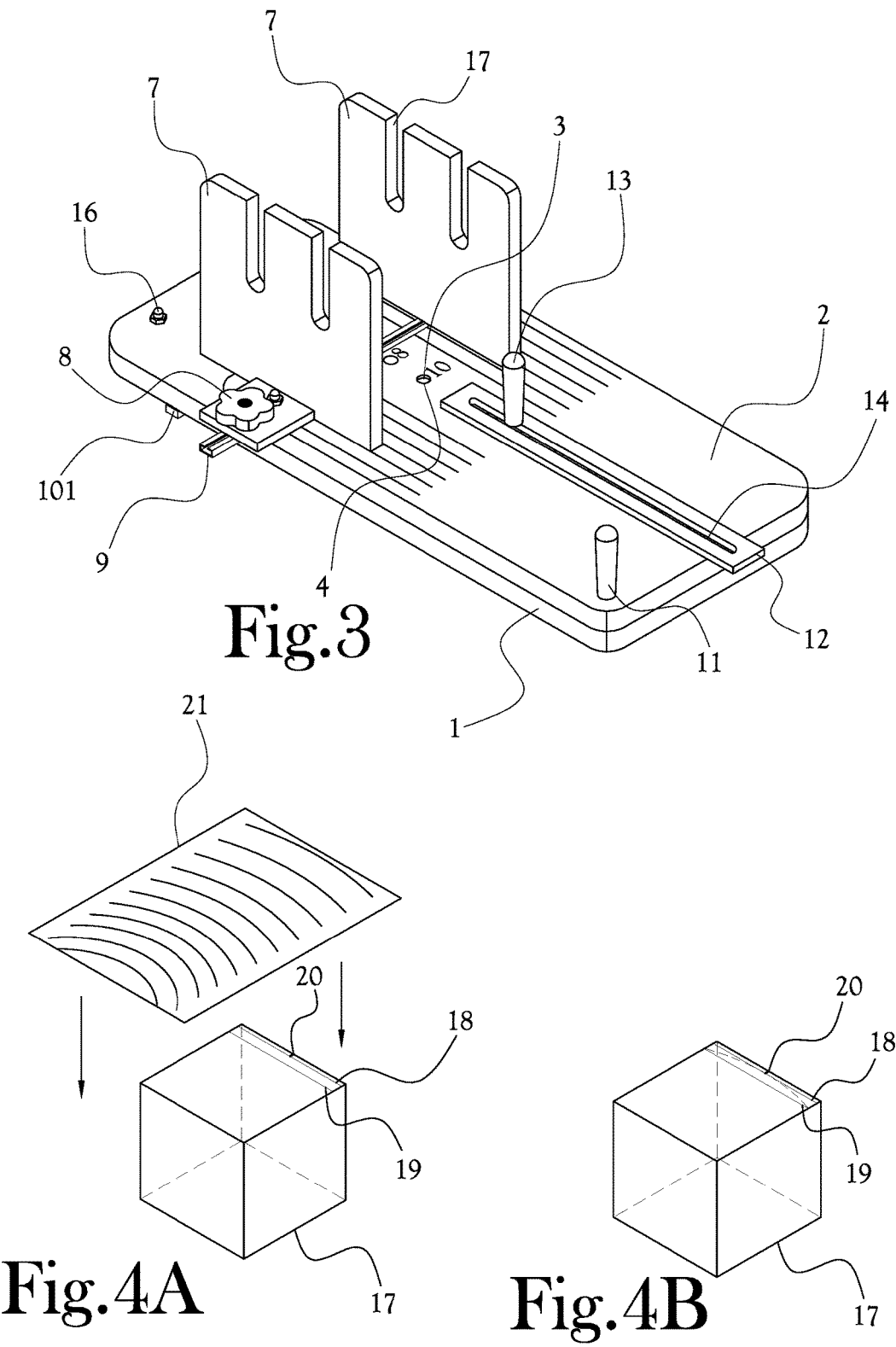

CONVEX CURVE CUTTER

CROSS-REFERENCE TO RELATED APPLICATIONS

This application claims the benefit of U.S. Provisional Application No. 62/493,525, filed on Jul. 8, 2016.

FIELD OF THE INVENTION

The present general inventive concept relates to the field of woodworking and more particularly to a bandsaw attachment permitting the cutting of symmetrical and asymmetrical convex curves into a multisided three dimensional workpiece.

BACKGROUND

A bandsaw is a power tool which uses a blade consisting of a continuous band of metal, usually steel, with teeth along one edge. The band usually rides on two wheels rotating in the same plane, although some bandsaws may have three or four wheels. Bandsaws produce uniform cutting action as a result of an evenly distributed tooth load. The point of the bandsaw's cut is fixed, the shape of the cut dependent upon how the material is fed into the blade. With the properly sized blade, the bandsaw operator can cut fairly tight curvatures as well as straight cuts using the bandsaw fence. The bandsaw's versatility makes it an essential tool among serious hobby woodworkers and professional woodworking craftsmen.

A popular project for both beginning and experienced woodworkers has been to construct jewelry boxes and keepsake boxes of various sizes and shapes. Many of these boxes have straight sides with the exception of the construction of concave sides. The methodology of making concave curves using the table saw is well known. The process for making bandsaw boxes is also well established. For some time, however, woodworkers have sought an inexpensive method that would offer the ability to consistently and precisely construct convex shapes on the sides of their projects. Suggestions to accomplish this using a combination of power and hand tools are extremely time consuming and not likely to achieve the consistency desired. Currently, there is no affordable method or process available to the woodworker that will easily and consistently shape convex curves on the sides of wood projects. Such a method is greatly needed and highly desirable.

Embodiments of the present general inventive concept can provide a new device and process that provides an affordable means for cutting repeatable convex curves into a workpiece.

BRIEF SUMMARY OF THE INVENTION

Embodiments of the present general inventive concept provide a directly mounted, portable bandsaw attachment for cutting symmetrical and asymmetrical convex curves into the sides of a workpiece comprising a stationary base structure that supports a rotating table and provides an attachment point for the rotating table, an opening in the stationary base structure to provided clearance for a bandsaw blade, a rotating table that supports laterally adjustable guides attached to the rotating table for positioning and securing the wood workpiece, and attachment means for securely mounting the stationary base structure to the bandsaw table.

Example embodiments of the present general inventive concept can be achieved by providing a method for cutting smooth symmetrical and asymmetrical convex curves into a workpiece comprising: providing a stationary base structure that supports a rotating table and provides an attachment and multiple pivot points for the rotating table; providing an opening in the stationary base structure to provide clearance for a bandsaw blade; providing a rotating table that supports and positions the workpiece in a stable position by means of laterally movable guides which are moveable within a channel or channels embedded in the rotating table and tightened to the channel or channels at desired positions; providing a removable pin which can be used to adjust the pivot point for the rotating table; providing a movable backstop which moves perpendicularly to the two movable guides and preventing backward movement of the workpiece during cutting; marking a cut line and edge margin line on a face of the workpiece within which the curve will reside, marking an apex point proximate to the margin line and close to the edge of the wood block, using a curve template with multiple curves of different radii, placing the template on the workpiece, and determining which best size radius curve to cut from the multiple different radius curves on the template; securely attaching the stationary base structure to the band saw table, attaching the rotating table to the stationary base structure and establishing the radius curve determined from the template by inserting the removable pin through the rotating table at a reference point representing the predetermined radius and into a corresponding hole in the stationary base structure; placing a workpiece on the rotating table between the two movable guides with the lateral position of the box assisted by the apex point marking, adjusting the laterally movable guides so that they rest securely against both sides of the workpiece, securing the laterally movable guides to the rotating table by tightening the movable guides in the channel or channels, sliding the workpiece rearward and rotating the rotating table so the workpiece is clear of the bandsaw blade, then move workpiece forward until bandsaw blade is lined up with the determined beginning cut line, moving the backstop until it rests against a back surface of the wood block, and securing the backstop to the rotating table; making a curved cut in the workpiece by rotating the rotating table and workpiece into the teeth of the band saw blade until the blade has cleared the wood workpiece, rotating workpiece box by ninety degrees towards the rear of the rotating table, re-securing the movable guides, lining up the saw blade at a desired cut line, re-securing the backstop, and repeating this last step until curved cuts have been made in all sides of the wood workpiece.

BRIEF DESCRIPTION OF THE DRAWINGS

Example embodiments of the present general inventive concept will become more clearly understood from the following detailed description of the present general inventive concept read together with the drawings in which:

FIG. 3 is a perspective view of a bandsaw attachment device according to an example embodiment of the present general inventive concept.

FIG. 4A is a perspective view of a wood box and radius curve template.

FIG. 4B is a perspective view of a wood box with reference marks used to determine proper radius of curve.

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
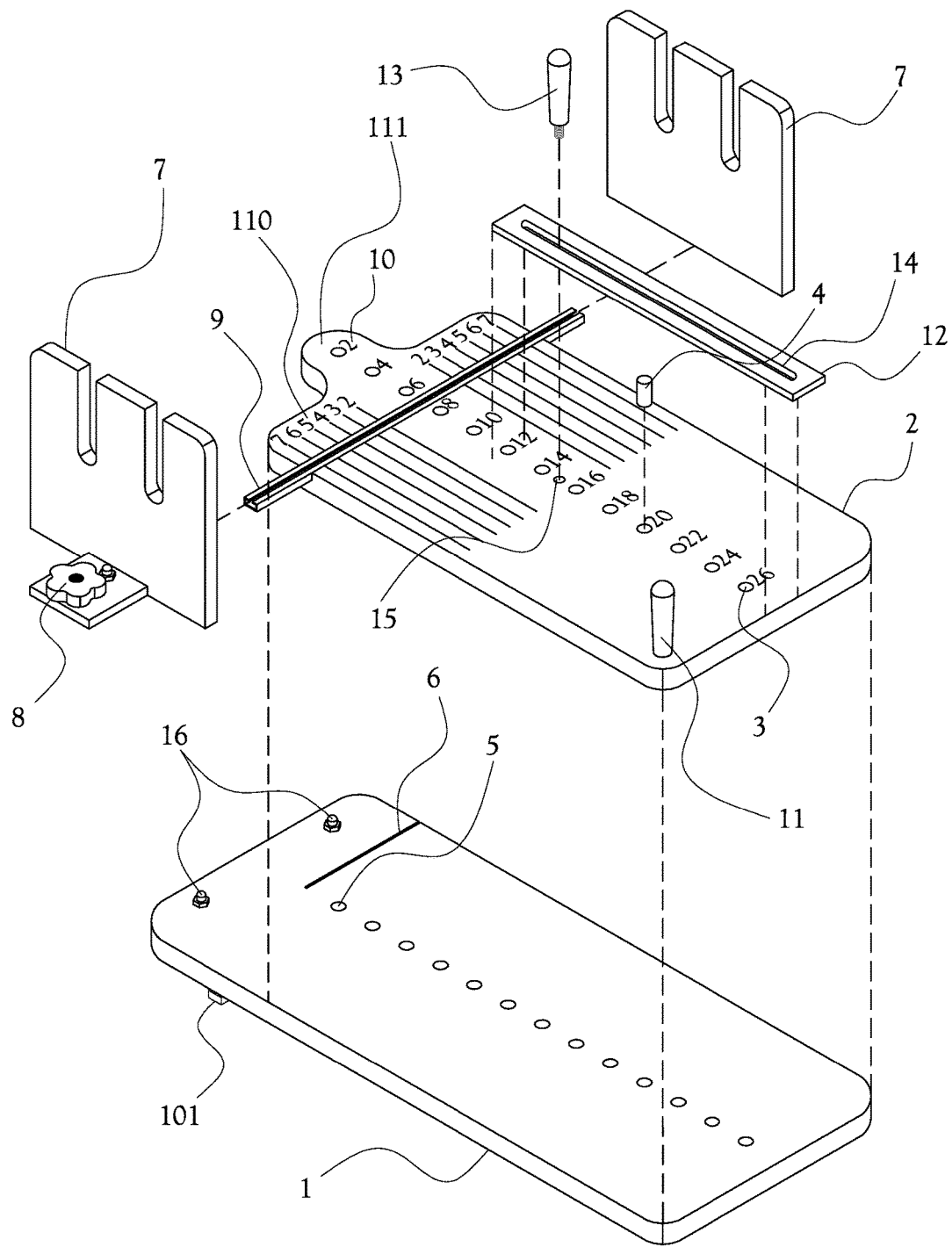
FIG. 1 is an exploded view of a bandsaw attachment device according to an example embodiment of the present general inventive concept.
Figure 2:
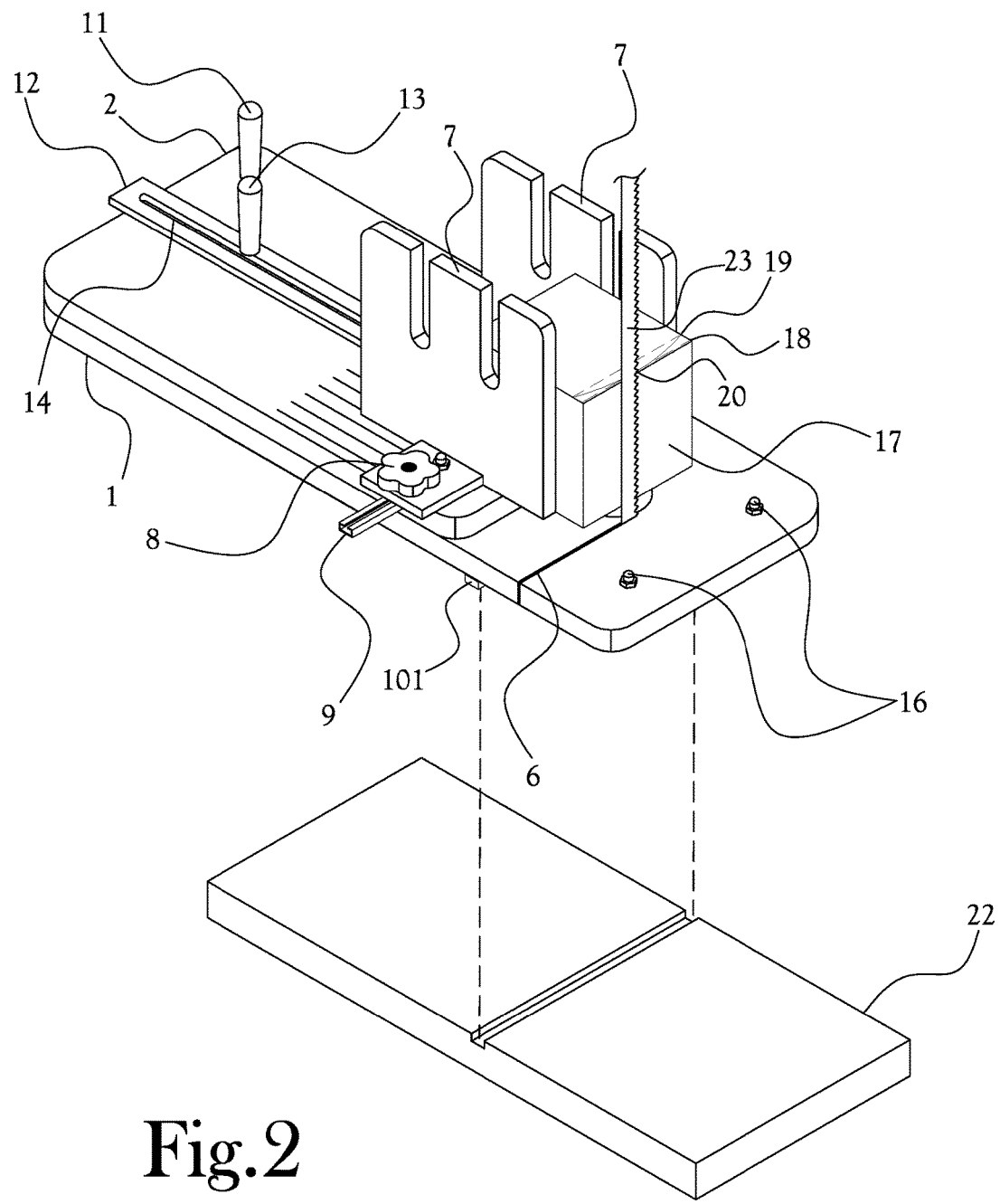
FIG. 2 is a perspective view of a bandsaw attachment device elevated over a bandsaw table according to an example embodiment of the present general inventive concept

FIG. 1 illustrates an example embodiment of the current invention which comprises a stationary base structure 1 which can reside on a bandsaw table. FIG. 2 shows an example embodiment of the current invention which comprises a stationary base structure 1 elevated over a bandsaw table. The stationary base structure 1 can have a protuberance 101 on its underside, which is able to mate with the mitre gauge channel on the bandsaw table. Such a protuberance 101 would rest within the mitre gauge channel and would provide stability for the stationary base structure 1. A rotating table or platform 2 resides above the base structure 1 and can be supported by the base structure 1. Pivot holes 3 in the rotating table 2 can be used as a pivot point in the rotating table 2. Although thirteen pivot holes 3 are shown in FIG. 1, it is clear that any number of pivot holes 3 can be provided to allow for multiple options for a pivoting position. Description of the use of the pivot holes 3 and rotating table 2 will be provided below. A pin 4 is shown in FIG. 1 to secure the rotating table 2 around a user-selected pivot point. Also shown in FIG. 1 are multiple base holes 5 on the base structure 1 which are used to receive the pin 4 from corresponding holes 3 in the rotating table 2 above. Also shown in FIG. 1 is a blade slot 6 which can be used as an opening in the base structure 1 for the bandsaw blade. One or more laterally movable guides or fences 7 can be provided to support the workpiece and assist the user in lining up the workpiece on the desired center of curvature. The lateral fences 7 are movable in the lateral direction and can be secured within a channel or channels 9 to provide stability. Longitudinal reference numbers 10 and lateral reference numbers 110 are also shown in FIG. 1. The longitudinal reference numbers 10 reside proximate to the corresponding holes 3 in the rotating table 2 and describe the convex curve radius that will be cut into the workpiece. At the forward end of the rotating table 2 is a nose portion 111 to define a minimum curve radius for the convex curve, which in some embodiments can be about two inches. The lateral reference numbers 110 describe the distance from the longitudinal center of the rotating table 2 to define the degree of symmetry or asymmetry of the convex curve to be cut into the workpiece relative to the location of the bandsaw blade. Lateral movement of one or more of the laterally moveable guides define the degree of symmetry or asymmetry of the convex curve. For example, if both fences 7 are located at distance marked 2 from the center of the The lateral fences 7 can be secured in place by knobs 8 which can be screwed onto bolts residing within the channel or channels 9, or any one of multiple attachment devices well known to those skilled in the art. FIG. 1 shows one knob 8 per lateral fence 7 although more than one knob 8 per lateral fence 7 can be used to provide additional stability.

Also shown in FIG. 1 is handle 11 which can be used for guiding the rotating table 2 as the bandsaw blade cuts through the workpiece. The handle 11 is shown in FIG. 1 in the lower left corner of the rotating table 2, but it could be in any number of locations on the rotating table 2. Also shown in FIG. 1 is a backstop 12 which can contact the back surface of the workpiece and provide support for the workpiece in the longitudinal direction opposite the blade and assists the user in lining up the workpiece a desired distance from the bandsaw blade. The backstop 12 can be moveably (adjustably) secured to the rotating table 2 by an attaching handle 13, which penetrates through a long slot 14 in the backstop 12 and received by a locking hole 15 in the rotating table 2. The backstop 12 can thus be adjusted along a continuous position along the length of the long slot 14. The attaching handle 13 can also be used along with or separate from the handle 11 for guiding the rotating table 2 as the bandsaw blade cuts through the workpiece. The base structure 1 can be attached to the band saw table by magnets 16, clamps or other attachment means known in the art. Vertical slots in the lateral fences 7 may be provided as a secure attachment point for clamps, and can provide additional stability for the wood block during cutting.

FIG. 3 shows an example embodiment of the current invention in one possible position for use of the device. The rotating table 2 is shown resting on top of the base structure 1. Pin 4 is shown inserted into pivot hole 3, setting that location as the pivot point for the rotating table 2. The lateral fences 7 are secured into place with the knobs 8. The backstop 12 has been secured to the rotating table 2 by an attaching handle 13 through the long slot 14 in the backstop 12. The forward end of the backstop 12 is shown in FIG. 3 proximate to the trailing ends of the lateral fences 7.

Example embodiments of the present general inventive concept can be described as follows. As shown in FIG. 4A, a rectangular wood box 17 will be used for workpiece in the description below. It is clear that the inventive device can be used to cut smooth and repeatable convex curves into multisided or other shaped workpieces. To build the rectangular box 17, any number of joining means known to those skilled in the art can be used. Prior to making any cuts, reference marks can be made on the wooden box 17 to mark the boundaries of the curved cut, as shown in FIG. 4A. One mark can determine the outer margin 18 of the cut while the other mark can determine the shoulder 19 of the cut. A third mark can be made to show the apex of radius 20 of the cut. For a box 17 with symmetrical curved sides, the mark showing the apex of radius 20 will generally be in the center position of the first side of the box 17 to be cut. For a box 17 with asymmetrical curved sides, the mark showing the apex of radius 20 will be to the right or left of the center position of the first side of the box 17 to be cut.

Once the boundaries of the cut have been marked on the box 17, a template 21 can be used to determine one of several different radii of curvature which will fit within the boundaries. As shown in FIG. 4A, the template 21 can be placed on top of the box 17 with one of the various curves of the template 21 positioned generally in the position of the boundaries. If there is sufficient clearance within the boundaries, the operator can utilize that radius curve. This process can be repeated until the operator finds a desired curvature that also fits within the boundaries, as shown in FIG. 4B. With the desired symmetrical or asymmetrical curvature determined as described above, the operator can place the pin 4 into the pivot hole 3 representing the curve radius determined above, in order to cut curves of the desired radius into the rectangular box 17.

Figure 5:
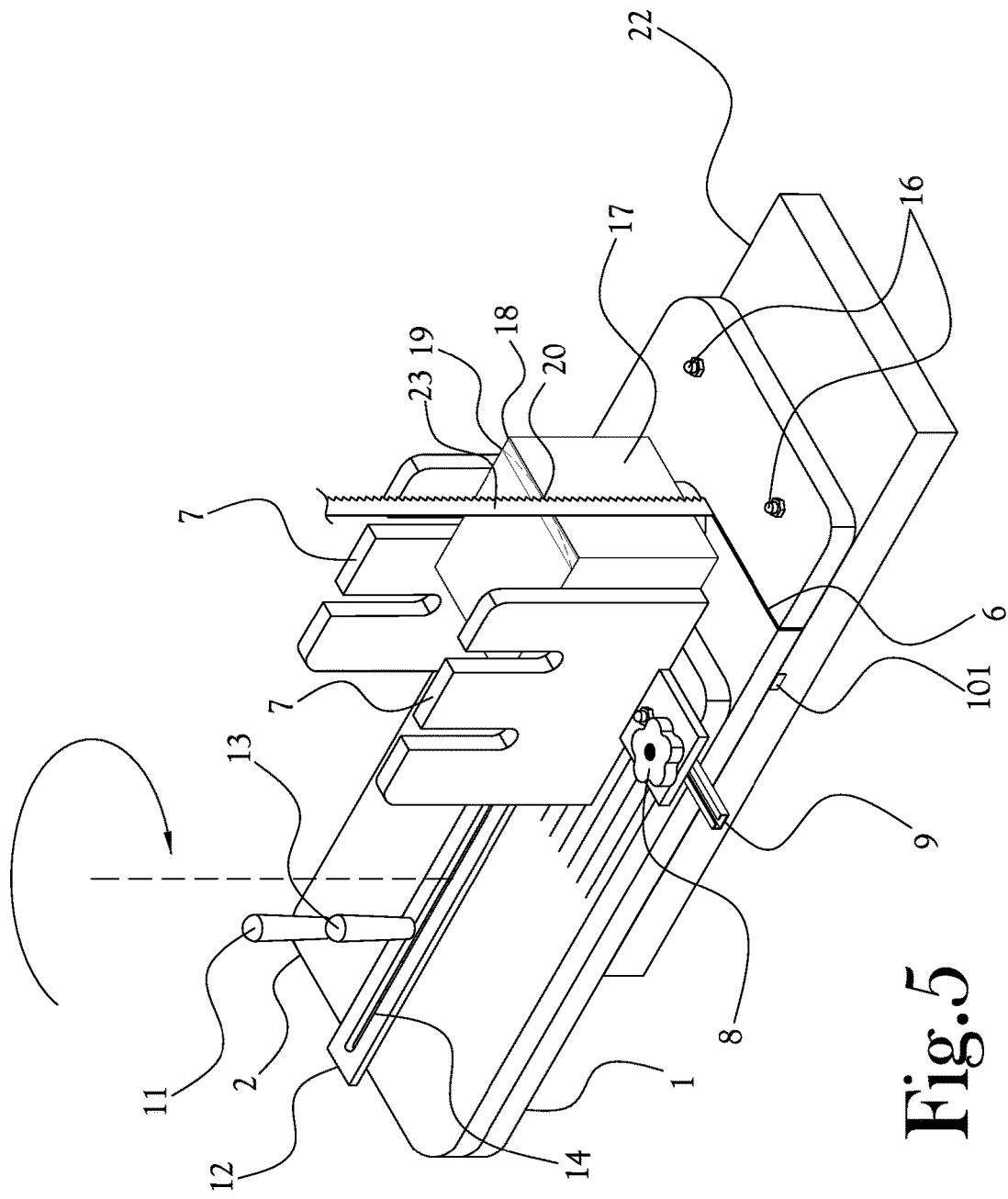
FIG. 5 is a perspective view of a bandsaw attachment device being used to make curved cuts, prior to the first cut with the rotating table in a neutral position, according to an example embodiment of the present general inventive concept.

FIG. 5 shows the rotating table 2 and stationary base structure 1 resting on the band saw table 22. The stationary base structure 1 can be attached to the bandsaw table 22 by means of magnets 16, clamps or various other attachment means known to those skilled in the art. The band saw blade 23 extends through the end of the blade slot 6. The operator can check for square between the bandsaw blade 23 and the top of the rotating table 2, and can adjust as necessary. The pin 4 can be positioned in the pivot hole 3 on the rotating table 2, which represents the pivot location necessary to make the desired predetermined radius curve, and the corresponding base hole 5 on the base structure 1. FIG. 5 shows a neutral position, where the boundaries of the rotating table 2 generally reside within the boundaries of the stationary base structure 1.

Figure 6:
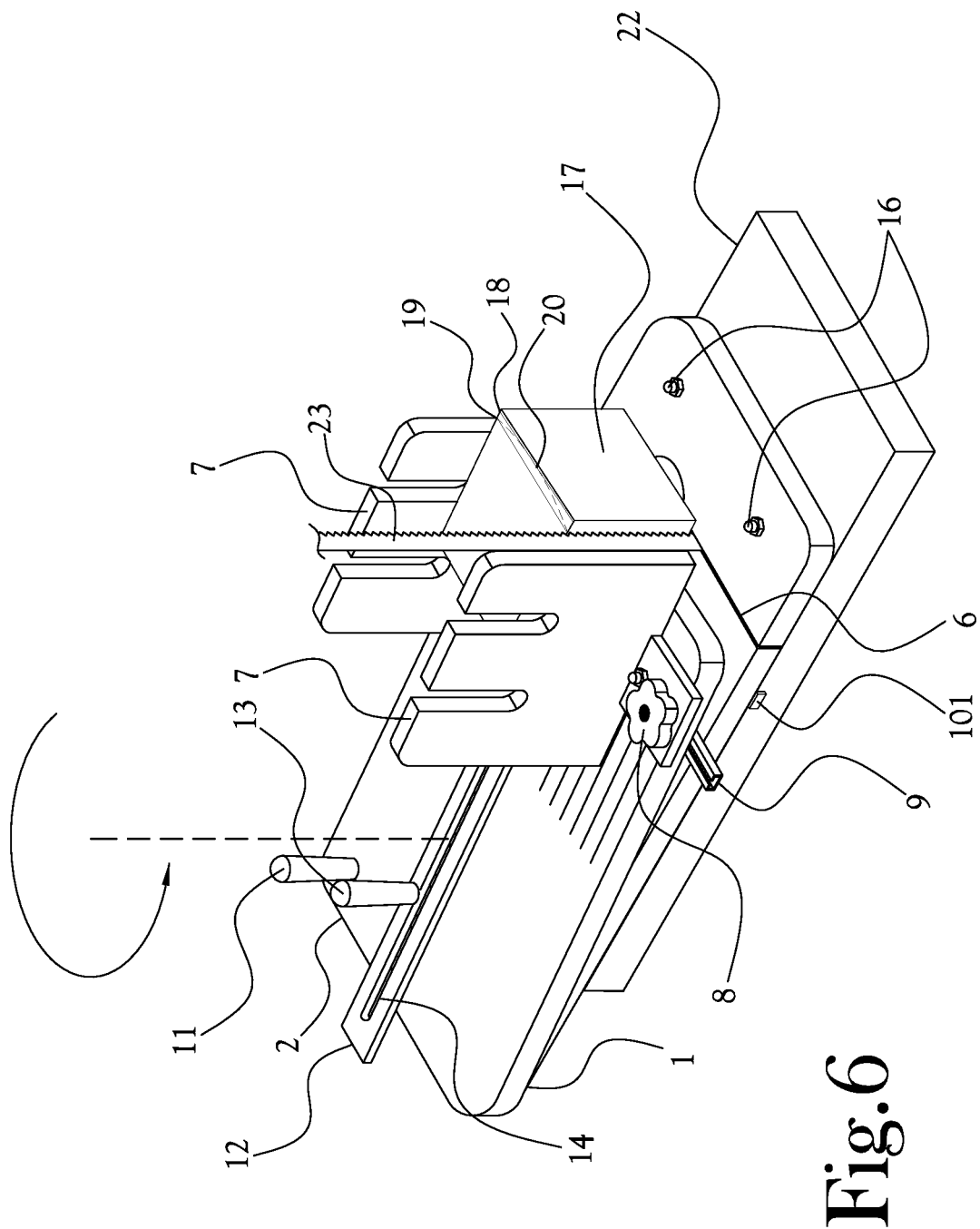
FIG. 6 is a perspective view of a band saw attachment device being used to make curved cuts, prior to the first cut with the rotating table in a rotated position to make the first cut, according to an example embodiment of the present general inventive concept.

FIG. 5 also shows the workpiece 17 placed between the lateral fences 7. To line up the workpiece 17 on the rotating table 2 in the lateral direction, the operator can position the mark of the workpiece showing the apex of radius 20 on the blade gullet, which is the lowest point of the valley between any two band saw blade tooth peaks. With the workpiece 17 lined up behind the blade 23 as mentioned above, and the lateral fences 7 parallel to the reference lines on the rotating table 2, the two lateral fences 7 can be adjusted so that they rest firmly against either side of the workpiece 17, and lateral fences 7 tightly secured to the channel or channels 9. The operator can adjust the longitudinal position of the workpiece 17 by first rotating the rotating table 2, as shown in FIG. 6, so that the blade 23 is clear of the workpiece 17. The longitudinal position of the workpiece 17 can then be adjusted until the blade teeth 23 are positioned against the cut line on the workpiece 17. Once the longitudinal position has been determined, the backstop 12 can be positioned directly behind the workpiece 17 in order to inhibit the workpiece 17 from moving in a direction away from the blade 23 during cutting operations, and secured to the rotating table 2 by tightening the attaching handle 13 through a long slot 14 in the backstop 12 and received by a locking hole 15 in the rotating table 2. Clamps may also secure the tops of the lateral fences 7 to provide additional stability.

Figure 7:
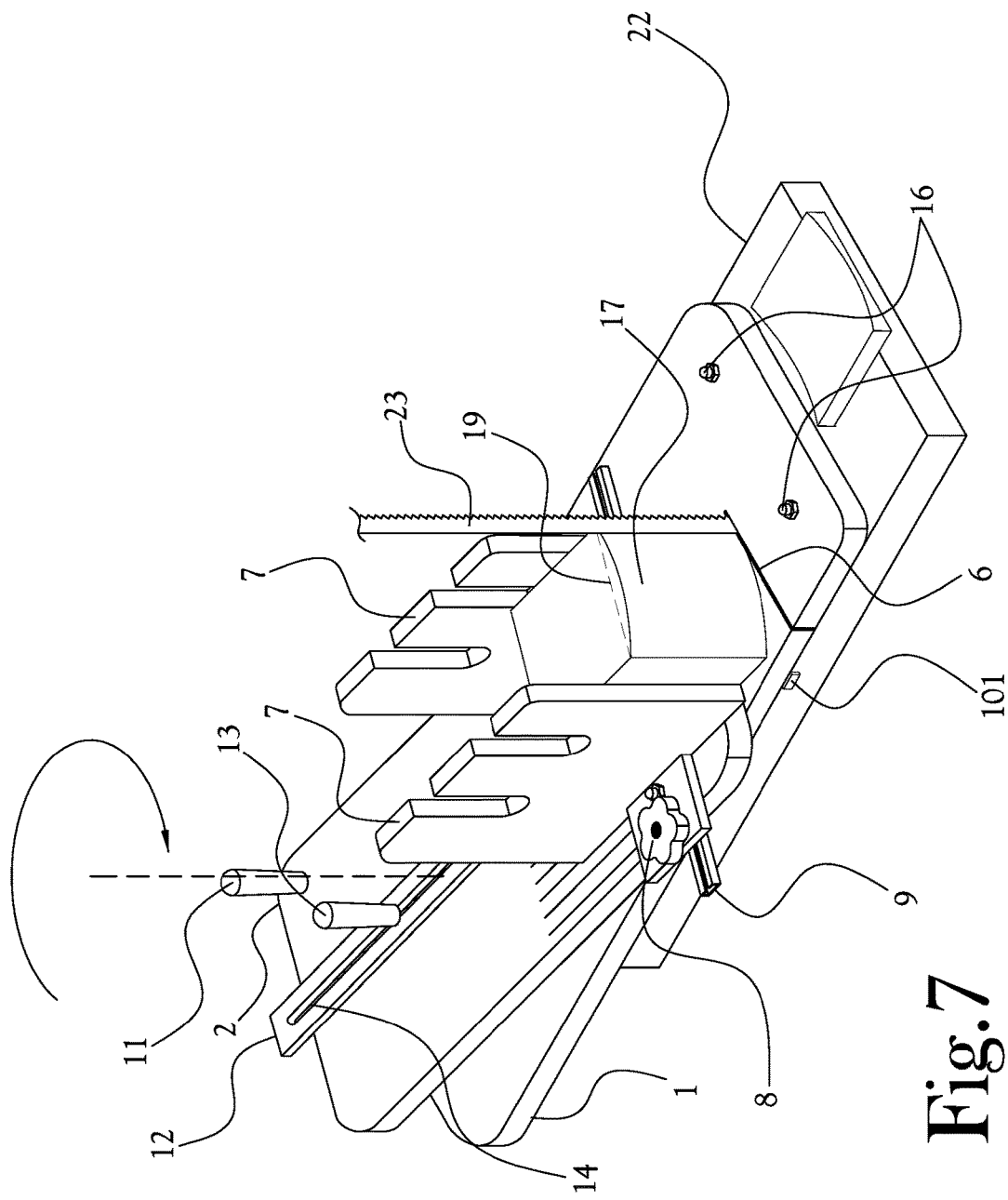
FIG. 7 is a perspective view of a bandsaw attachment device being used to make curved cuts, after the first cut, according to an example embodiment of the present general inventive concept.

FIG. 6 shows the workpiece 17 and device generally in position to make the first cut. The teeth of the blade 23 are proximate to the side of the workpiece 17 by the cut line representing the lower cutting boundary determined by the curve template 21. The operator can activate the bandsaw and rotate the workpiece 17 via the rotating table 2 to make the first curved cut. FIG. 7 shows the workpiece 17 after completion of the first curved cut. To make the remaining curved cuts, the workpiece 17 can be rotated in place until all sides are complete.

Figure 8:
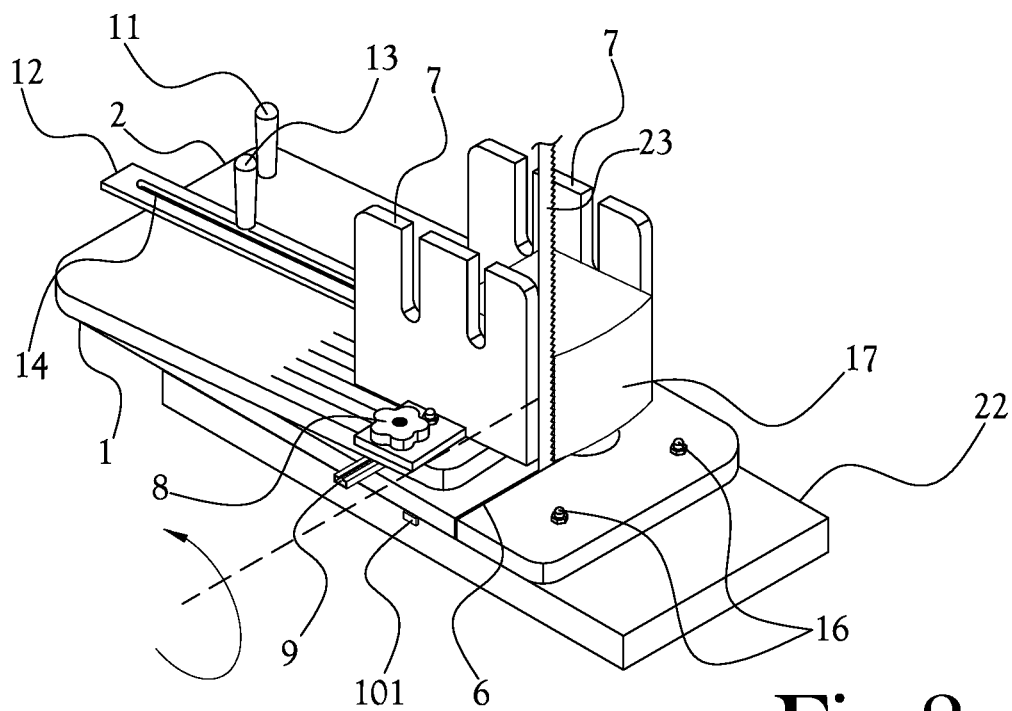
FIG. 8 is a perspective view of a bandsaw attachment device being used to make curved cuts, prior to making the second cut and prior to rotation of the workpiece, according to an example embodiment of the present general inventive concept.
Figure 9:
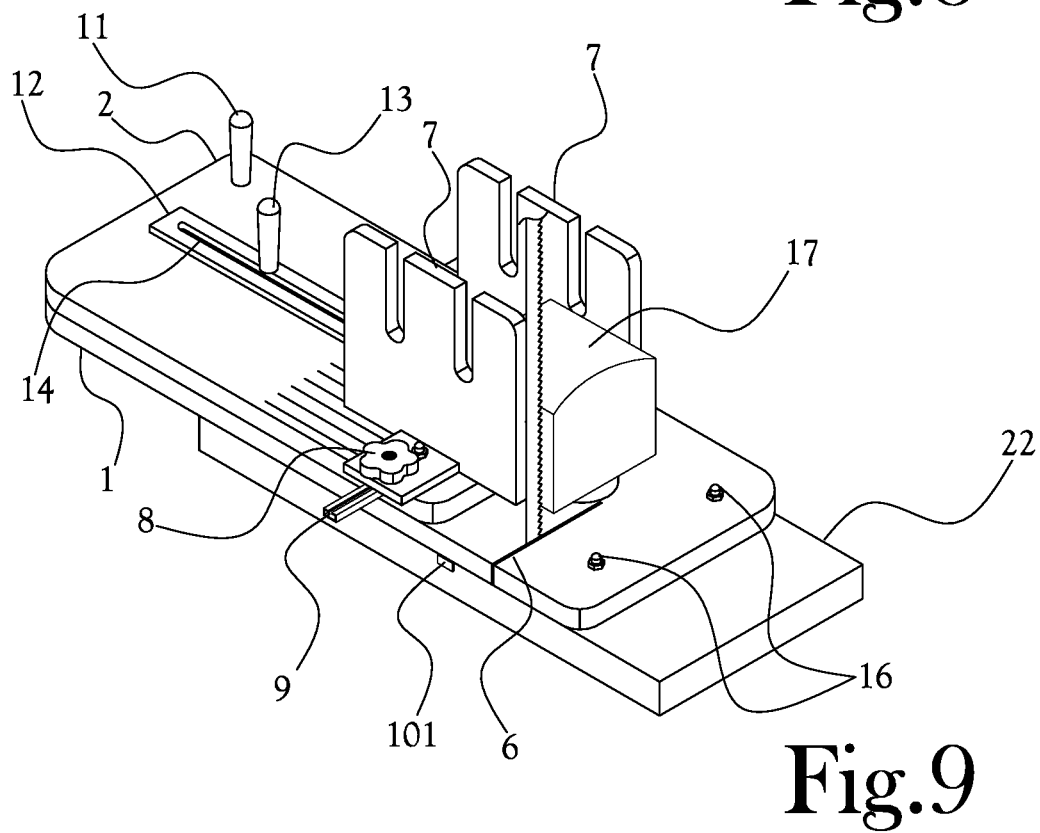
FIG. 9 is a perspective view of a bandsaw attachment device being used to make curved cuts, prior to making the second cut and with the workpiece rotated, according to an example embodiment of the present general inventive concept.

FIG. 8 shows a possible rotation of the workpiece 17 after the initial cut according to an example embodiment of the current invention. Facing the left side of the device, the operator can rotate the workpiece 17 in a clockwise fashion by ninety degrees within the device, i.e., towards the rear of the device. FIG. 9 shows the workpiece 17 after it has been rotated clockwise and generally in position for the next cut. The operator can adjust the longitudinal position of the workpiece 17 by first rotating the rotating table 2 so that the blade 23 is clear of the workpiece 17. The longitudinal position can then be adjusted until the blade 23 is lined up with the cut line on the workpiece 17. In the example embodiment provided, by rotating the workpiece 17 towards the rear of the device for each subsequent cut after the initial, the operator can utilize the location of the prior cut as a cut line when lining up the workpiece 17. Once the workpiece 17 has been lined up, the backstop 12 can be positioned directly behind the workpiece 17, in order to inhibit the workpiece 17 from moving in a direction away from the blade 23, and secured to the rotating table 2 by tightening the attaching handle 13 through a long slot 14 in the backstop 12 and received by a locking hole 15 in the rotating table 2. Clamps may also be provided to secure the top of the lateral fences 7.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While example embodiments have been illustrated and described, it will be understood that the present general inventive concept is not intended to limit the disclosure, but rather it is intended to cover all modifications and alternate devices and methods falling within the spirit and the scope of the invention as defined in the appended claims.

What is claimed is:

1. A portable bandsaw attachment permitting the cutting of symmetrical and asymmetrical convex curved surfaces into a multisided three dimensional workpiece, comprising:
a rotating table configured to support the workpiece on a bandsaw table;
a stationary base configured to support the rotating table on the bandsaw table and to provide multiple attachment points for rotatably attaching the rotating table to the stationary base, the attachment points being incrementally spaced apart along a longitudinal axis of the stationary base such that selection of a particular attachment point defines a radius of curvature to be cut into the first side of the workpiece, wherein each attachment point defines a different radius of curvature; and
two or more laterally movable guides attached to the rotating table and configured to locate a first side of the workpiece relative to a bandsaw blade on a predetermined center of curvature of a convex curve to be cut into the first side of the workpiece, wherein rotation of the rotating table relative to the stationary base rotates the moveable guides and the workpiece relative to the bandsaw blade such that when the bandsaw blade is operating and aligned to cut the first surface, the first surface rotates relative to the bandsaw blade as the bandsaw blade is cutting the first surface to create a convex curvature into the first surface.

2. The bandsaw attachment of claim 1, further comprising a longitudinally adjustable backstop attached to the rotating table to contact a back surface of the workpiece to maintain longitudinal stability and inhibit rearward movement of the workpiece during the cutting operation.

3. The bandsaw attachment of claim 1, wherein the laterally movable guides are attached to the rotating table such that the laterally moveable guides are laterally adjustable relative to a longitudinal axis of the rotating table to position the workpiece relative to the bandsaw blade to define a degree of symmetry or asymmetry of the convex curve.

4. The bandsaw attachment of claim 1, wherein the rotating table is attached to the stationary base structure by a removable pin and rotates around the removable pin.

5. The bandsaw attachment of claim 3, wherein the rotating table includes visual indications identifying a particular radius of curvature to be cut into the workpiece.

6. The bandsaw attachment according to claim 1, including attachment means for securely mounting the stationary base to the bandsaw table.

7. The bandsaw attachment of claim 5, wherein the attachment means for securely mounting the stationary base to the bandsaw table consists of at least two magnets embedded in the underside of the stationary base.

8. The bandsaw attachment of claim 3, wherein the laterally movable guides are removably attached to one or more channels in the rotating table to facilitate lateral adjustment of the laterally moveable guides.

9. The bandsaw attachment of claim 8, wherein the laterally movable guides have a height dimension configured such that a side surface of the laterally moveable guides support the workpiece laterally with respect to the bandsaw blade during cutting of the first surface.

10. The bandsaw attachment of claim 7, wherein the stationary base includes a protuberance on the underside of the stationary base to mate with a mitre gauge channel formed in the bandsaw table.

11. The bandsaw attachment of claim 10, further comprising an opening in the stationary base structure to provide clearance for the bandsaw blade.

12. The bandsaw attachment of claim 5, wherein the rotating table includes a nose portion configured to define a minimum radius of curvature for the convex curve.

* * * * *